United States Patent [19]

Poloso

[11] Patent Number: 5,736,618
[45] Date of Patent: Apr. 7, 1998

[54] HIGH DENSITY POLYETHYLENE WITH IMPROVED THERMOFORMING CHARACTERISTICS

[76] Inventor: Anthony Poloso, 1078 Randolph Dr., Yardley, Pa. 19067

[21] Appl. No.: 435,916

[22] Filed: May 5, 1995

[51] Int. Cl.$^6$ .................................................. C08F 8/00
[52] U.S. Cl. ........................... 525/387; 525/333.8
[58] Field of Search ................................. 525/387

[56] References Cited

U.S. PATENT DOCUMENTS

| | | | |
|---|---|---|---|
| 3,376,238 | 4/1968 | Gregorian et al. | 260/2.5 |
| 3,622,554 | 11/1971 | Behr et al. | 260/2.5 |
| 3,631,161 | 12/1971 | Fan et al. | 260/94.9 |
| 3,764,628 | 10/1973 | Gregorian et al. | 260/610 R |
| 3,923,947 | 12/1975 | Cook | 264/141 |
| 4,006,283 | 2/1977 | MacKenzie, Jr. et al. | 526/57 |
| 4,015,058 | 3/1977 | Schober | 526/57 |
| 4,202,790 | 5/1980 | Steller | 252/186 |
| 4,226,905 | 10/1980 | Harbourne | 428/220 |
| 4,489,034 | 12/1984 | Davison | 525/240 |
| 4,578,431 | 3/1986 | Shaw et al. | 525/387 |
| 5,530,072 | 6/1996 | Shirodkar | 525/333.8 |

*Primary Examiner*—Bernard Lipman
*Attorney, Agent, or Firm*—Dennis P. Santini; Marina V. Schneller

[57] ABSTRACT

The melt strength and the thermoforming characteristics of high density polyethylene are improved significantly with no adverse effects on extrusion conditions by lightly crosslinking the resin using low levels of organic peroxides or electron beam radiation.

8 Claims, 4 Drawing Sheets

HIGH DENSITY POLYETHYLENE WITH IMPROVED THERMOFORMING CHARACTERISTICS

FIELD OF THE INVENTION

Substantial, if not complete, elimination of sagging and shear thinning of high density polyethylene extruded sheets when heated to 350°–550° F. and disposed in a mold is effected in accordance with the invention. The high density polyethylene resin is altered with respect to low shear viscosity properties and elasticity to eliminate the sag and provide a uniform drawdown of material. These characteristics of high density polyethylene are improved significantly with little or no adverse effects on extrusion conditions.

BACKGROUND OF THE INVENTION

Amorphous resins, e.g. polystyrene, poly(vinyl chloride) and poly(methylmethacrylate), are preferred for thermoforming, as sheets of these resins soften but do not sag easily when heated. Sagging causes thinning; and a sagged sheet may have more surface area than the mold, resulting in folds and areas of double thickness or areas that have been stretched too thin. Foamed sheets can be used to form, meat trays, egg cartons, and plates. Solid sheets are used to produce numerous products such as food containers and pick-up truck bed liners. Thermoforming is also the basis for skin packaging; plastic is formed directly over a product, e.g., screws, and is adhered to a card backing. The process also is used to make blisters for blister packaging. KIRK-OTHMER, *ENCYCLOPEDIA OF CHEMICAL TECHNOLOGY*, VOL. 18, page 200 [Third Ed.].

Thermoforming is a process by which the resin is first formed into a sheet with a thickness of 10 to 500 mils. This sheet is then heated in an oven to soften the resin and is then forced into a mold cavity using pressure, vacuum or both. The forming is usually assisted mechanically by a plug which helps stretch the sheet into the cavity. Such products as food containers and pickup truck bed liners are typically made using this process. Standard HDPE resins have poor melt strength and are prone to excessive sagging during the thermoforming process. This lack of melt strength also causes them to draw unevenly giving rise to a poor distribution of material in the walls of the thermoformed article (shear thinning).

SUMMARY OF THE INVENTION

In the present invention, the melt strength of high density polyethylene is increased by treatment with low levels of high temperature peroxides. This treatment results in low levels of crosslinking in the HDPE and increased low shear viscosity and elasticity. The treated HDPE has improved thermoforming characteristics, primarily sag resistance, material distribution, operating window, and cycle time compared to untreated HDPE.

This technique also improves the thermoforming characteristics of the resin while leaving the extrusion characteristics almost unchanged. This means that the sheet formation operation is not effected significantly while thermoforming behavior is improved dramatically.

DESCRIPTION OF THE DRAWING(S)

DETAILED DESCRIPTION OF THE INVENTION

In accordance with the invention, uncrosslinked virgin or recycle high density polyethylene [used interchangaeably herein with the acronym "HDPE"] will be treated to prevent sagging which can occur in the oven or mold of a thermoforming process. The treatment herein comprises compounding the HDPE with a peroxide.

This may be done in an inert atmosphere or air and an antioxidant may be added, if desired, without significantly changing the final product.

Figure 1:
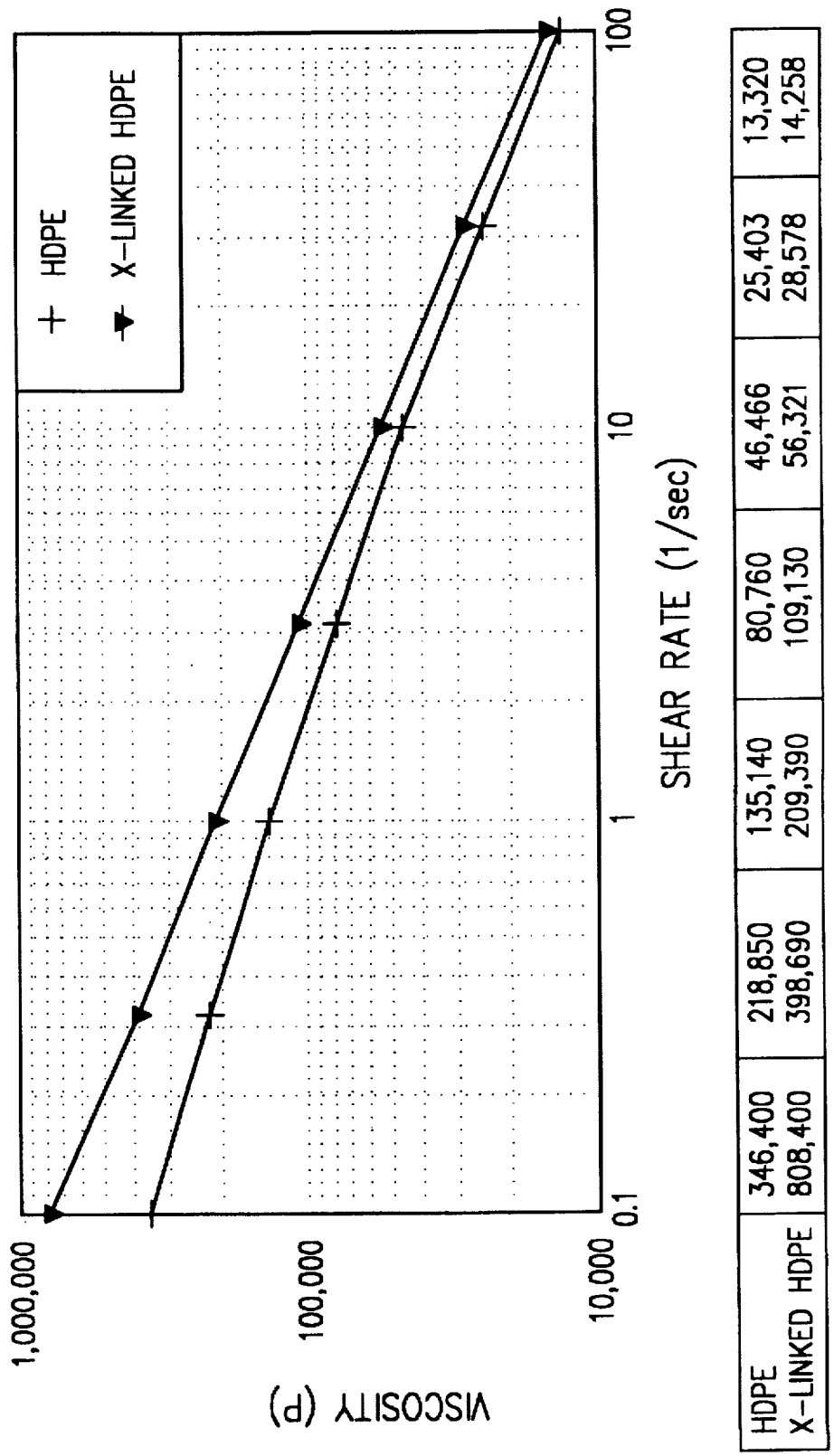
FIG. 1 is a graph of the plot of viscosity v. shear rate (1/sec) with respect to the resulting product of Example 1.
Figure 2:
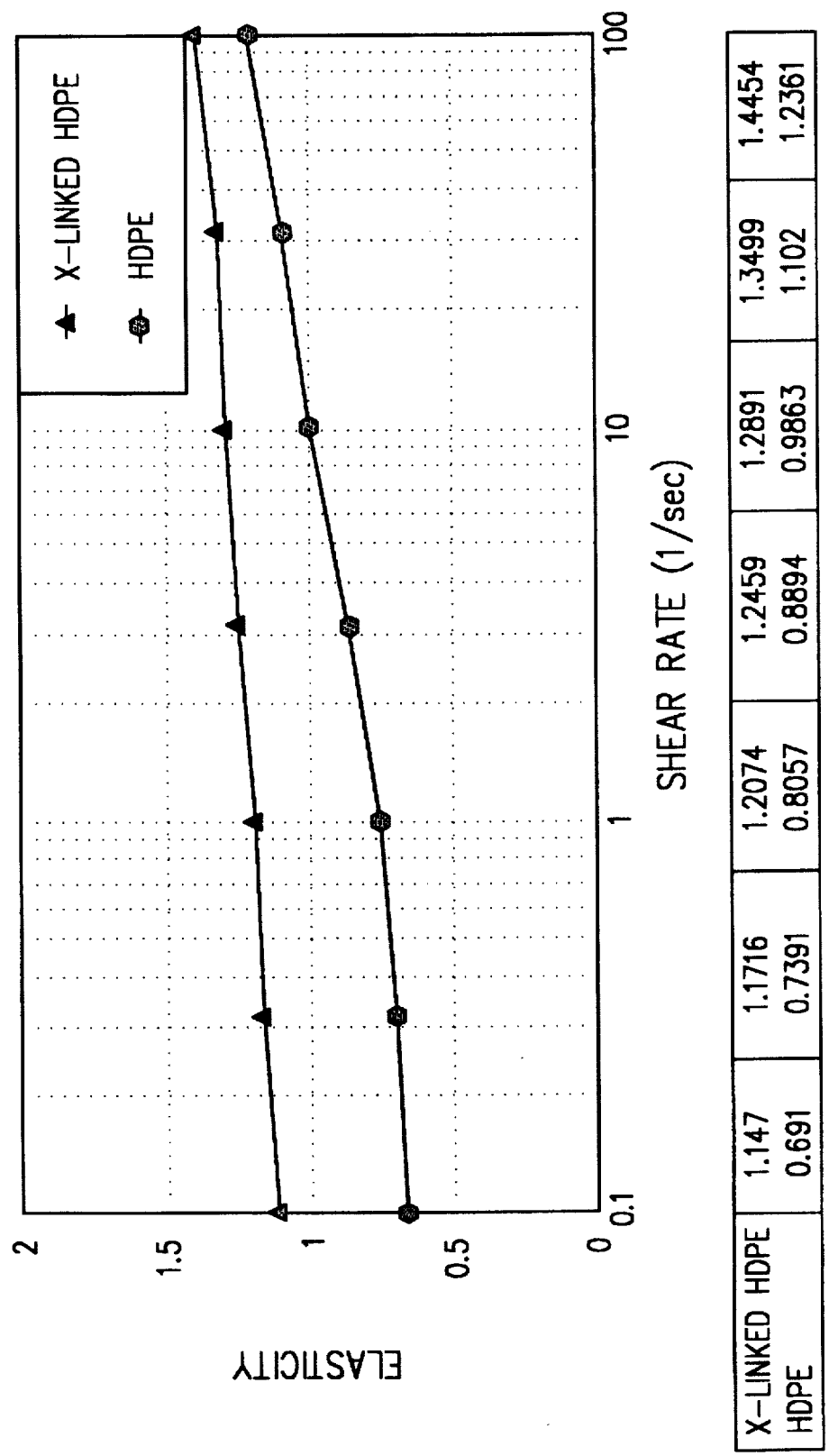
FIG. 2 is a graph of the plot of elasticity v. shear rate (1/sec) with respect to the resulting product of Example 1.
Figure 3:
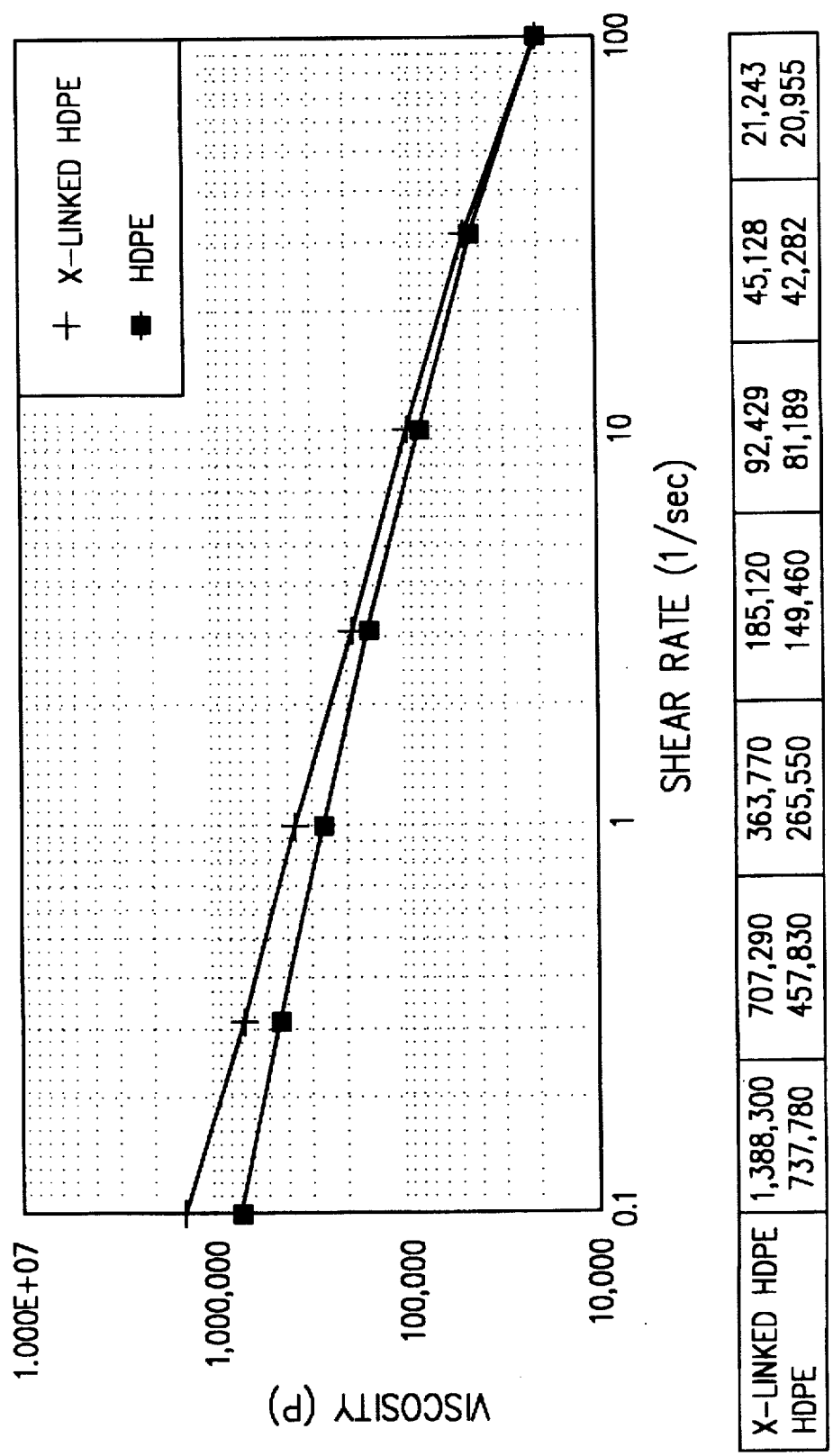
FIG. 3 is a graph of the plot of viscosity v. shear rate (1/sec) with respect to the resulting product of Example 2.
Figure 4:
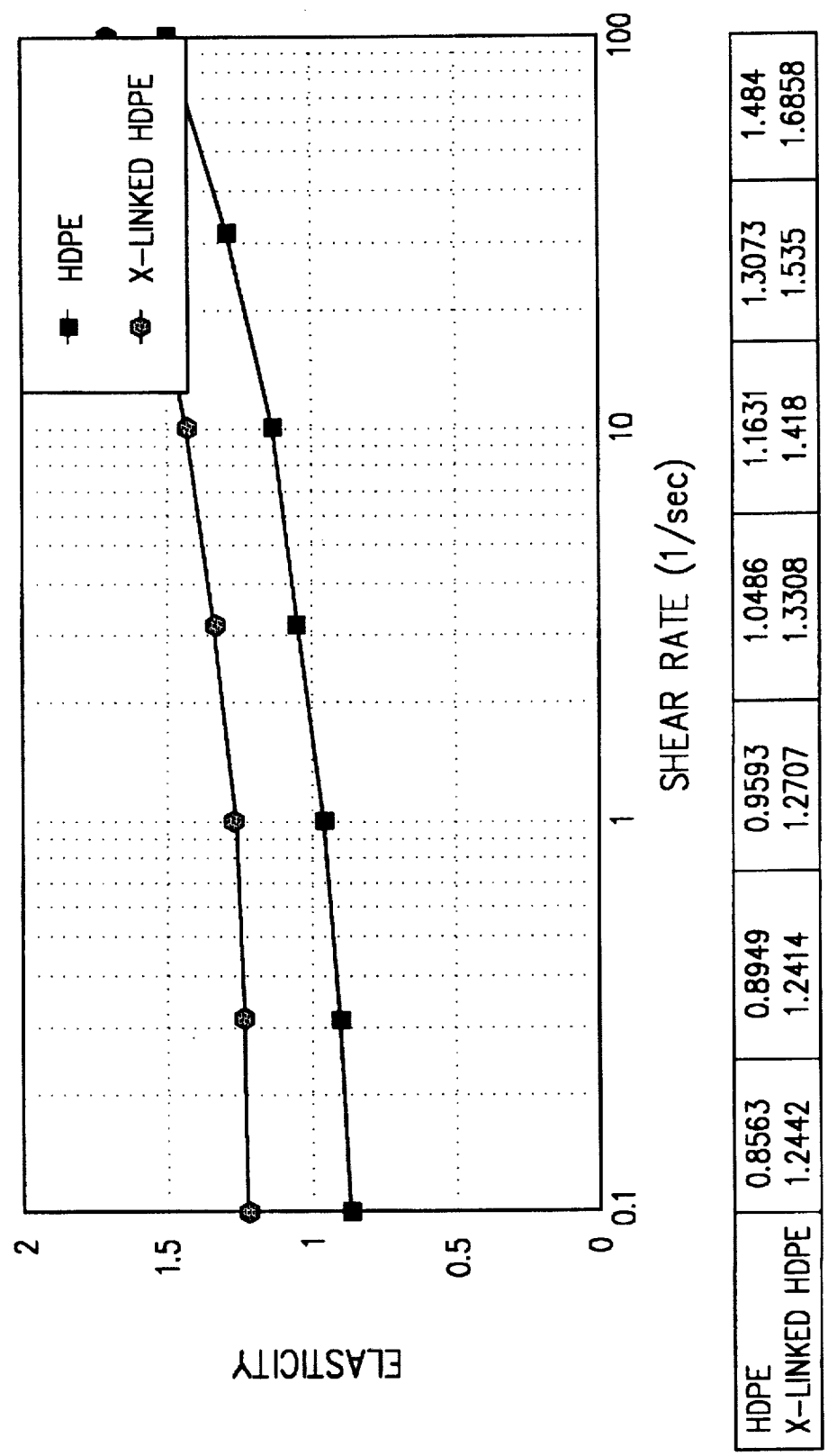
FIG. 4 is a graph of the plot of elasticity v. shear rate (1/sec) with respect to the resulting product of Example 2.

The treatment is undertaken at temperatures of 200° to 275° C., to increase the viscosity measured at low shear rates ($<10$ sec$^{-1}$) without substantially increasing the viscosity measured at higher shear rates ($>100$ sec$^{-1}$); in other words the ratio of the viscosity of treated HDPE to untreated HDPE ranges from 1.3–4.0 at low shear rates, preferably 1.5–3.0, and from 1.0 to 1.3 at higher shear rates, preferably 1.0 to 1.1. The viscosity is reported herein in units of poise and is determined by use of a Rheometrics System IV rheometer; the shear rate is reported herein in units of 1/seconds and is determined in the same way. For example, low shear viscosity more than doubled while the higher shear viscosity increased only slightly. This is a significant finding in that increasing in high shear viscosity correlate to loss of processability. Cf. FIGS. 1 and 2. The rheology of the treated material of Example 1 was changed significantly as shown in the attached drawings (I & II). A large increase in elasticity was also seen. The elasticity is reported herein as the ratio of G' to G", the elastic modulus to storage modulus.

The same effect on rheology is seen in the sample of Example 2, below, as shown in Drawings III and IV. Low shear viscosity is almost doubled while higher shear viscosity remains close to its original value. These increases in elasticity and low shear viscosity are apparently attributable to crosslinking in the treated HDPE.

The untreated uncrosslinked HDPE is contacted as by blending, with a peroxide at a temperature of 200°–275° C. If desired, an antioxidant can be added and will normally range from 300 to 3000 ppm based on the desired level of oxidative stability in the final product. The types of antioxidants include phosphites such as TNPP amd hindered phenols, which are available under the tradenames Irgaphos and Irganox.

The amount of peroxide will be in the range from 10 to 500 ppm based on the blend of HDPE, antioxidant and peroxide. However, preferably, the peroxide amount ranges from 10 to 100 based on the HDPE weight. More preferably, the peroxide of the blend is about 50–100 ppm (by weight). At 10 to 100 ppm peroxide levels of addition, there is no significant increase in high shear viscosity and thus no loss of processability. At higher levels of peroxide reagent addition, the high shear viscosity increases significantly with significant reduction in processability.

The types of peroxides which are used are high temperature peroxides that can undergo almost complete decomposition at normal compounding temperatures (190°–260° C.). Suitable but non-limiting examples of such peroxide are: dicumyl peroxide, 2,5-dimethyl-2,5-di-(tert butyl peroxy) hexane, tert-butyl cumyl peroxide, di-(2-tert-butylperoxyisopropyl) benzene, di-tert-butyl peroxide, 2,5- dimethyl-2,5-di-(tert-butylperoxy)hexyne-3, cumene hydroperoxide these contain 2 to 20 carbon atoms. The peroxide treated HDPE may be blended using any of various methods known in the art.

High density ethylene polymers and copolymers (HDPE) used in this invention are homo polymers and copolymers of ethylene which exhibit a density of 0.94 to 0.97 g/cc, preferably 0.94 to 0.965 g/cc. These polymers may be ethylene homopolymers or ethylene copolymers of alpha-olefins containing a minor amount, preferably about 0.1 to 25 mole percent of an olefin, preferably a 1-olefin, containing 3 to 10 carbon atoms, e.g., 1-propene, 1-butene, 1-pentene, 1-hexene, 4-methyl-1-pentene, 1-heptene, and 1-octene. The preferred olefin comonomers are 1-butene, 1-hexene and 1-octene.

The flow index or high load melt index of the HDPE ($I_{21}$, measured at 190° C. in accordance with ASTM D-1238, Condition F) is generally at least about 2, preferably from about 5 to 70 and most preferably about 5 to 55 g/10 min., while the melt flow ratio MFR, defined as the ratio of flow index (21) to melt index ($I_2$), measured at 190° C. in accordance with ASTM D-1238, Condition E, is at least about 50, preferably about 60 to 300, and most preferably about 70 to 200.

The HDPE may be prepared by any of various methods known in the art, preferably in the presence of chrome containing catalysts described in U.S. Pat. Nos. 2,825,721, 3,324,101 and 5,096,868, which are relied upon and incorporated by reference herein. The catalysts contain titanium, chromium, magnesium, and admixtures thereof which give rise to the catalyst residues in the as-polymerized [as-synthesized]resin. The as-synthesized HDPE will contain 0.01 to 20, preferably 0.1 to 5 ppm of Cr (elemental).

These catalysts are especially suitable for producing copolymers of ethylene and $C_3$–$C_{10}$ alpha olefins in a gas phase, fluid bed reactor at temperatures less than 108° C., and at pressures of less than 400 psi, to produce granular polymer resins having acceptable HLMI values of about 5–50.

The peroxide treated HDPE may be prepared using any of various methods known in the art. For example, the two components may be melt or dry blended and the blend added directly to an extruder.

The treated HDPE may then be formed directly into extruded sheets or into pellets for later extrusion into extruded sheet.

The extruded sheet may be cut into individual pieces or constitute a continuous web. During extrusion, colorant and other additives such as antisensitive agents may be added. The extruded sheet may be 5 to 500, preferably 8 to 300 mils thick.

After extrusion into sheet, heating is undertaken in an oven for 5–500 seconds at usually about 800°–1200° F. These times and temperatures are determined by the thickness of the sheet melting point of the HDPE and type of mold.

Then the heated plastic sheet is formed in a mold [the mold may be under vacuum and/or pressure, e.g. a female mold may be under vacuum—and a plug may be used. The mold may have multicavities; in production of baby wipes, the mold may have 8 to 10 even 16 cavities.

Molding can be from individual sheets or a continuous web which may range 8 to 300 mil thick.

The steps of extrusion, heating and molding may be undertaken as a continuous process.

EXAMPLES

Example 1

A granular HDPE base resin (0.954 density, 47 Flow Index, 65 MFR) was compounded on a Farrel Continuous Mixer (4 FCM) at 255° C. under a nitrogen blanket with 100 ppm of peroxide (Triganox 101) and 500 ppm of Irganox 1076. The resulting pellets had a FI of 16. The rheology of the treated material was changed significantly as shown in the attached drawings (I & II). The low shear viscosity more than doubled while the higher shear viscosity increased only slightly. A large increase in elasticity was also seen. This indicates a large increase in melt strength which was the purpose of the experiment.

The crosslinked HDPE was then extruded into a sheet on a Welex single screw extruder. The resin was processed into a roll of sheet 19 inches wide and 60 mils thick to be used for thermoforming. The material was processed and compared to untreated HDPE.

| Sample | Feed Rate | Melt Temperature | Pressure | Amps |
|---|---|---|---|---|
| Standard HDPE | 300 lb/hr | 200° C. | 1600 psi | 145 |
| Crosslinked HDPE | 300 lb/hr | 200° C. | 1800 psi | 155 |

The data indicates that a slight increase in pressure and power required to extrude the material is noticed. This, however, is not a significant increase and is typical of the variation seen when extruding different HDPE resins of the same family.

The sheet formed was then thermoformed into deep draw rectangular containers used for baby wipes on a Brown thermoformer. Sheet is indexed into an oven where the resin is heated above its melting point. It then moves into the forming station where a plug assisted vacuum mold forms the container. This container was chosen because it is very difficult to thermoform with HDPE due to its deep draw and rectangular shape. The dimensions of the container are W=5 inches, L=7.5 inches, D=5.5 inches.

The container was thermoformed at different cycle times until an optimum container was produced as judged by material distribution in the walls. A commercial grade of HDPE used to make this container was also run in the same fashion. The crosslinked material showed a 20% reduction in cycle time over the standard HDPE. The containers were then tested with the following results.

| Sample | Cycle Time | Crush Strength |
|---|---|---|
| HDPE | 12.5 sec. | 37.5 psi |
| Crosslinked HDPE | 10.0 sec. | 58.5 psi |

| Material Distribution Wall Thickness (mils) | | | | |
|---|---|---|---|---|
| | Bottom | Side (top) | Side (middle) | Side (bottom) |
| HDPE | 55 | 22 | 28 | 35 |
| Crosslinked HDPE | 39 | 28 | 30 | 29 |

In addition to cycle time, there was a significant improvement in crush strength of the container. This is measured by crushing the container at a constant speed (2 inches/min) in an Instron tester and measuring the force. Failure is defined as the point at which the wall or corner of the container buckles or creases. The improvement in crush strength can be directly attributed to the much more even distribution of material in the walls and bottom of the container made from crosslinked material. This is made possible by the improved elasticity and increased low shear viscosity. Another advantage, which was not quantitatively measured, was the low sag of the crosslinked HDPE. There was almost no sag of this sheet even at high cycle times and temperatures.

Example 2

A higher molecular weight granular HDPE resin (0.950 density, 10 Flow Index) was compounded on a Farrel continuous mixer (4 FCM) at 245° C. under a nitrogen blanket with 60 ppm of peroxide (Triganox 101) and 1000 ppm each of Irganox 1010 and TNPP. The resultant material had a Flow Index of 4.0. The same effect on rheology is seen in this sample as shown in drawings III and IV. Low shear viscosity is almost doubled while higher shear viscosity remains close to its original value. A significant increase in elasticity is also seen.

A thick sheet was produced by extruding this resin on the Welex single screw extruder producing a 150 mil thick sheet, 36 inches wide. The uncrosslinked product was also extruded into sheet of the same dimensions to compare processing characteristics.

| Sample | Feed rate | Melt Temperature | Pressure | Amps |
|---|---|---|---|---|
| Standard HDPE | 400 lb/hr | 230° C. | 2100 psi | 195 |
| Crosslinked HDPE | 400 lb/hr | 230° C. | 2300 psi | 192 |

The data shows a slight increase in pressure and no appreciable difference in power required to fabricate sheet from the crosslinked HDPE.

Thus it is apparent that there has been provided, in accordance with the invention, a product, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for molding sheets of a high density polyethylene in a mold having at least one cavity, wherein the process comprises contacting an uncrosslinked high density polyethylene with a peroxide to form a treated product;

whereby the contacted uncrosslinked high density polyethylene is altered to exhibit an increased viscosity and increased elasticity compared to the low shear viscosity and the elasticity of an uncrosslinked high density polyethylene; heating;

extruding the altered high density polyethylene into an extruded sheet of 5 to 500 mils thickness;

heating the extruded sheet to a temperature above the melting point of the high density polyethylene at which temperature the uncrosslinked high density polyethylene sags but at which temperature the extruded sheet becomes plastic without sag;

advancing the heated, plastic, extruded sheet to a mold, and conforming the heated, plastic, extruded sheet to the mold to form an article comprising a resin which consists of high density polyethylene.

2. The process of claim 1, wherein conforming comprises applying a vacuum.

3. The process of claim 1, wherein conforming comprises use of pressure.

4. The process of claim 1, wherein conforming comprises use of a mechanical plug.

5. The process of claim 1 where extrusion of sheet is done at no loss in output due to the treatment at the same extrusion conditions.

6. The process of claim 1, wherein the uncrosslinked polyethylene is treated with 10 to 100 ppm by weight of peroxide, at a temperature in the range of 200° to 275° C., to increase the viscosity measured at low shear rate (less than 10 sec−1) without substantially increasing the viscosity measured at higher shear rate (of greater than 100 sec−1).

7. The process of claim 6 wherein a ratio of the viscosity (viscosity being measured in units poise) of the treated product to untreated product ranges from 1.3–4.0 at low shear rate (less than 10 sec−1).

8. The process of claim 1 wherein the sheet has a thickness of 10 to 500 mils.

* * * * *